(12) United States Patent
Ryu (10) Patent No.: US 8,547,645 B2
(45) Date of Patent: Oct. 1, 2013

(54) LENS SYSTEM

(75) Inventor: Jae-myung Ryu, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 237 days.

(21) Appl. No.: 12/683,498

(22) Filed: Jan. 7, 2010

(65) Prior Publication Data

US 2010/0177407 A1 Jul. 15, 2010

(30) Foreign Application Priority Data

Jan. 12, 2009 (KR) .................. 10-2009-0002386

(51) Int. Cl.
*G02B 15/14* (2006.01)
*G02B 15/22* (2006.01)

(52) U.S. Cl.
USPC .......................................... 359/693; 359/689

(58) Field of Classification Search
USPC ............... 359/683, 689, 791, 792, 745–748, 359/643–645, 686, 693
See application file for complete search history.

(56) References Cited

U.S. PATENT DOCUMENTS

| | | | | |
|---|---|---|---|---|
| 4,553,823 A | * | 11/1985 | Kato et al. | 359/755 |
| 4,621,909 A | * | 11/1986 | Hamanishi | 359/755 |
| 4,807,983 A | * | 2/1989 | Matsushita | 359/755 |
| 5,598,299 A | | 1/1997 | Hayakawa | |
| 5,946,136 A | * | 8/1999 | Suzuki | 359/557 |
| 2003/0103269 A1 | | 6/2003 | Takato | |
| 2005/0141102 A1 | | 6/2005 | Arakawa | |

FOREIGN PATENT DOCUMENTS

| | | |
|---|---|---|
| JP | 06-308386 | 11/1994 |
| JP | 07-294853 | 11/1995 |
| JP | 2003-161877 | 6/2003 |
| JP | 2003-279849 | 10/2003 |
| JP | 2005-189727 | 7/2005 |
| JP | 2007-271752 | 10/2007 |

* cited by examiner

*Primary Examiner* — Zachary Wilkes
(74) *Attorney, Agent, or Firm* — Drinker Biddle & Reath LLP (57) ABSTRACT

A lens system including: a first lens group having a positive refractive power; a second lens group having a positive refractive power; and a third lens group having a positive or negative refractive power, wherein the first lens group comprises four or less lenses, and the first through third lens groups are movable, independently, during focusing and have magnifications in a range from −1 to 0.

9 Claims, 12 Drawing Sheets

LENS SYSTEM

CROSS-REFERENCE TO RELATED PATENT APPLICATIONS

This application claims the benefit of Korean Patent Application No. 10-2009-0002386, filed on Jan. 12, 2009, in the Korean Intellectual Property Office, the disclosure of which incorporated herein in its entirety by reference.

BACKGROUND OF THE INVENTION

1. Field of the Invention

The present invention relates to a lens system that has a large aperture and is capable of close-up photographing.

2. Description of the Related Art

Recently, digital single lens reflex cameras including an image sensor, such as a charge coupled device (CCD) or complementary metal oxide semiconductor (CMOS), are becoming more popular than SLR film cameras. With an increase in users' needs and the development of image sensors, the digital single lens reflex cameras have been developed to have a high number of pixels. An interchangeable lens that is used in the digital single lens reflex cameras requires excellent optical performance.

A digital single lens reflex camera includes a reflective mirror. A reflective mirror bends the optical path 90 degrees before photographing so that a user can recognize a photographing angle through a view finder. After photographing, the reflective mirror is inclined 45 degrees so that light is not irradiated on the reflective mirror, but is irradiated in an image sensor. In regards to a digital single lens reflex camera, an interchangeable lens requires a long back focal length so that the reflective mirror does not collide with the interchangeable lens. A double Gauss lens system is widely used to satisfy the long back focal length.

By using the double Gauss lens system, spherical aberration that results from a large-aperture lens system can be efficiently reduced and a back focal length can be obtained in the digital single lens reflex cameras. In the double Gauss lens system, an aberration is corrected by using symmetry, in which two lens groups disposed at both sides of a stop have similar refractive powers.

In the double Gauss close up lens system during focusing, a front lens group moves and the back lens group is fixed. However, when a large-aperture lens system having a small F-number is used with the double Gauss close-up lens system, the diameter of the back lens group increases, and the size of a camera increases. Thus, it is not easy to miniaturize the double Gauss close-up lens system.

SUMMARY OF THE INVENTION

An embodiment of the invention provides a single focus lens system which has a large aperture and is capable of close-up photographing.

According to an embodiment, there is provided a lens system including: a first lens group having a positive refractive power; a second lens group having a positive refractive power; and a third lens group having a positive or negative refractive power, wherein the first lens group comprises four or less lenses, and the first through third lens groups are movable, independently, during focusing and the lens system has is magnification in a range from −1 to 0.

According to another embodiment, there is provided a lens system including: a first lens group having a positive refractive power; a second lens group having a positive refractive power; and a third lens group having a positive or negative refractive power, wherein the first through third lens groups are movable, independently, during focusing and the lens system has magnification in a range from −1 to 0 and satisfies the following Equation $$0.4 \leq \frac{f_2}{f_1} \leq 0.6$$

where $f_1$ is the focal length of the first lens group, and $f_2$ is the focal length of the second lens group.

The third lens group may satisfy the following Equation $$0.25 \leq \frac{\Delta d_3}{f} \leq 0.8$$

where $\Delta d_3$ is the amount of movement of the third lens group, and f is the focal length of the overall lens system.

The lens system may further include a stop disposed between the first lens group and the second lens group.

The third lens group may have a refractive index that can be obtained using the following Equation $$1.65 \leq n_d \leq 2.0$$

where $n_d$ is the refractive index at d-line of the material used in the third lens group.

The second lens group may include doublet or triple cemented lenses.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

The present invention will now be described in detail by explaining exemplary embodiments of the invention with reference to the attached drawings.

A lens system according to the present invention has a large aperture and is capable of close-up photographing up to 1 magnification (M).

Figure 1:
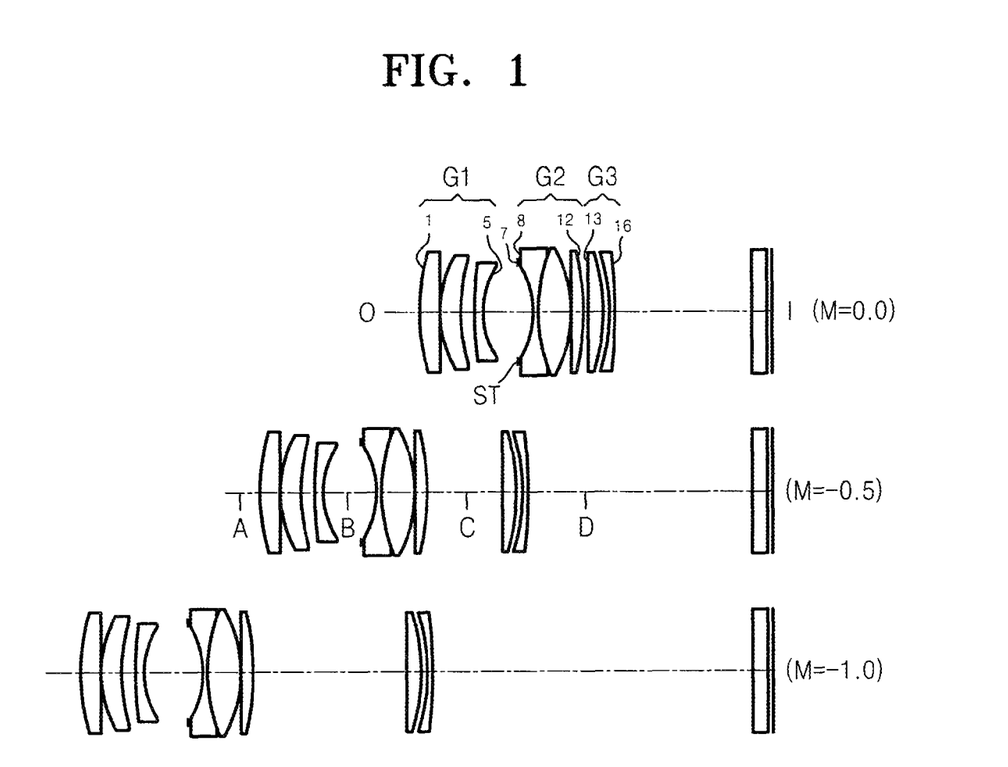
FIG. 1 is a view showing a structural arrangement of a lens system according to an embodiment of the present invention, when magnification (M) meets the following Equations: M=0, M=−0.5, and M=−1.0, respectively.

FIG. 1 is a view showing the structural arrangement of a single-focus lens system according to an embodiment of the present invention, when magnification (M) meets the following Equations: M=0, M=−0.5, and M=−1.0, respectively. Referring to FIG. 1, the single-focus lens system according to the current embodiment includes a first lens group G1 having a positive refractive power, a second lens group G2 having a positive refractive power, and a third lens group G3 having a positive or negative refractive power. According to this embodiment, the first lens group G1 may include three lenses, and the second lens group G2 may include three or four lenses, and the third lens group G3 may include two lenses. In the current embodiment, the first through third lens groups G1, G2, and G3 are movable, relative to one another and independently, during focusing and have magnifications in the range from −1 to 0. In the current embodiment, the first lens group G1 and the second lens group G2 have a symmetrical structure to each other having positive refractive powers, thereby easily correcting aberration. Thus, the number of lenses in the first lens group G1 does not need to be increased so that the first lens group G1 can correct aberration. For example, the first lens group G1 may include four or less lenses. An aperture stop ST is disposed between the first lens group G1 and the second lens group G2, and the first lens group G1 and the second lens group G2 may have a symmetrical structure centered on the stop ST. Thus, a macro lens in which curvature of an image field and distortion aberration can be reduced and having a small F-number thus providing high brightness and is capable of photographing with 1 magnification may be provided.

Meanwhile, in the case of a single lens reflex camera, the diameter of the third lens group G3 disposed near an image side I may be small so as to obtain a reasonable back focal length. All of the first, second, and the third lens groups G1, G2, and G3 are movable relative to one another during focusing and thus, the diameter of the third lens group G3 is reduced. The first lens group G1 has a relatively large change in magnification during focusing, and the second lens group G2 does not have a relatively large change in magnification during focusing. Thus, the focal length of the first lens group G1 having a relatively large change in magnification may be large, and the focal length of the second lens group G2 having a relatively small change of magnification may be small. For example, the first lens group G1 and the second lens group G2 may have focal lengths that may be obtained according to Equation 1.

$$0.4 \leq \frac{f_2}{f_1} \leq 0.6 \qquad (1)$$

is where $f_1$ is the focal length of the first lens group G1, and $f_2$ is the focal length of the second lens group G2. The first lens group G1 and the second lens group G2 satisfy Equation 1, and thus, a change of aberration due to focusing is reduced.

The third lens group G3 may satisfy the following Equation 2 so as to provide a lens system that is suitable for a single lens reflex camera.

$$0.25 \leq \frac{\Delta d_3}{f} \leq 0.8 \qquad (2)$$

where $\Delta d_3$ is the amount of movement of the third lens group G3, and f is the focal length of the overall lens system. When the third lens group G3 moves by a large distance, CAM lengths for moving the first through third lens groups G1, G2, and G3 increase accordingly, and it is not easy to provide the single-focus lens system illustrated FIG. 1. When the third lens group G3 satisfies Equation 2, the diameter of the third lens group G3 may be reduced so that the single-focus lens system of FIG. 1 can be provided to be suitable for a single lens reflex camera. The single-focus lens system according to the current embodiment has an F-number that is smaller than 2.1 and has a large aperture. The single-focus lens system of FIG. 1 may also be used as an interchangeable lens of the single lens reflex camera by reducing the diameter of the third lens group G3.

Next, the third lens group G3 may have a refractive index that may satisfy Equation 3 below. Thus, the Petzval's sum of the third lens group G is reduced, and curvature of an image field of the single-focus lens system of FIG. 1 may be correspondingly reduced, and the radius of curvature of a lens may therefore be increased so that the single-focus lens system of FIG. 1 is advantageous for correction of spherical aberration.

$$1.65 \leq n_d \leq 2.0 \qquad (3)$$

where $n_d$ is a refractive index at d-line of the material used in the third lens group G3.

Figure 3:
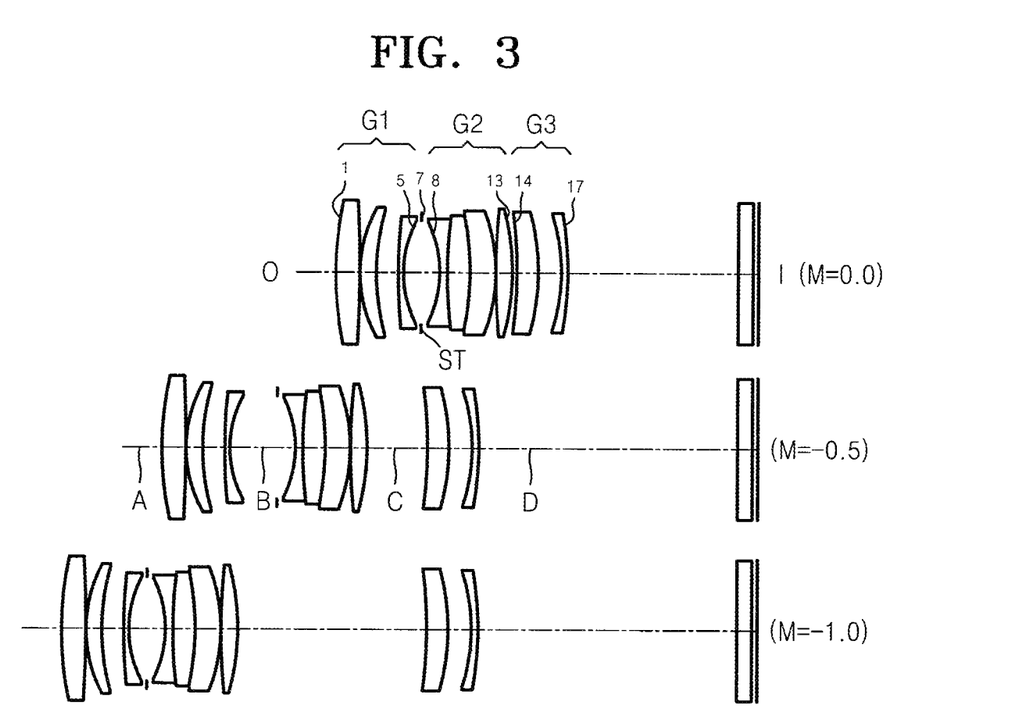
FIG. 3 is a view showing a structural arrangement of a lens system according to another embodiment of the present invention, when magnification (M) meets the following Equations: M=0, M=−0.5, and M=−1.0, respectively.
Figure 4A:
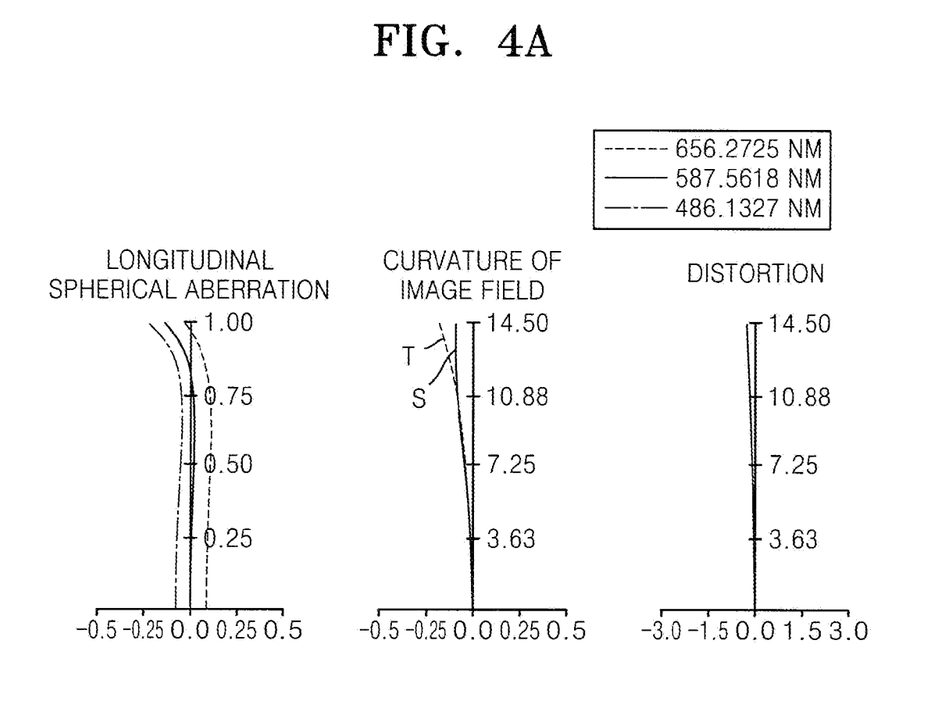
FIG. 4A is a graph showing longitudinal spherical aberration, curvature of an image field, and distortion of the lens system illustrated in FIG. 3, when M=0.0.
Figure 4B:
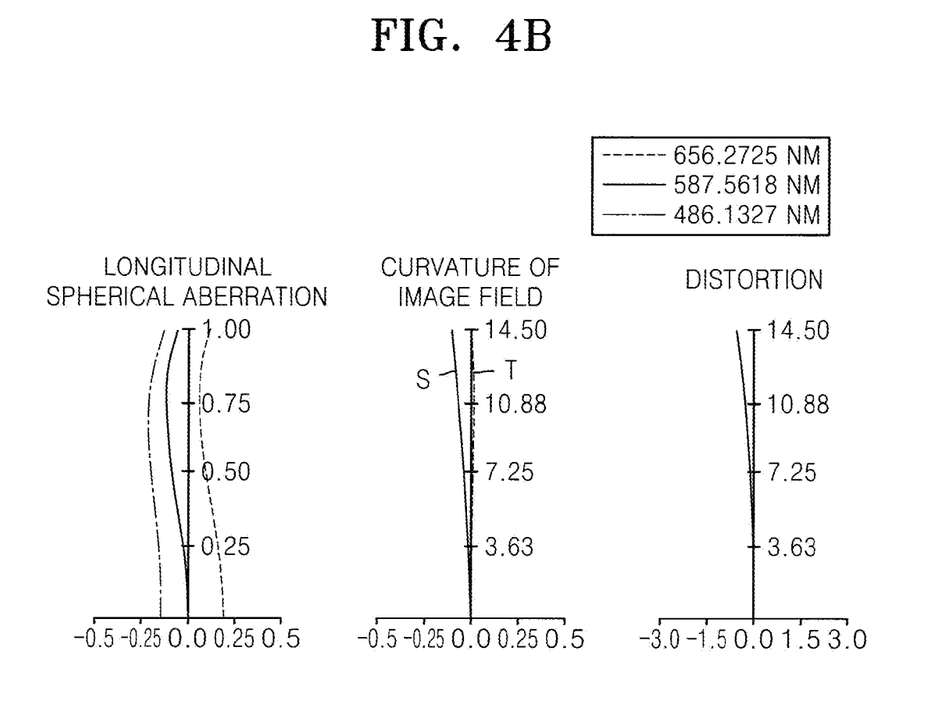
FIG. 4B is a graph showing longitudinal spherical aberration, curvature of an image field, and distortion of the lens system illustrated in FIG. 3, when M=−0.5.
Figure 4C:
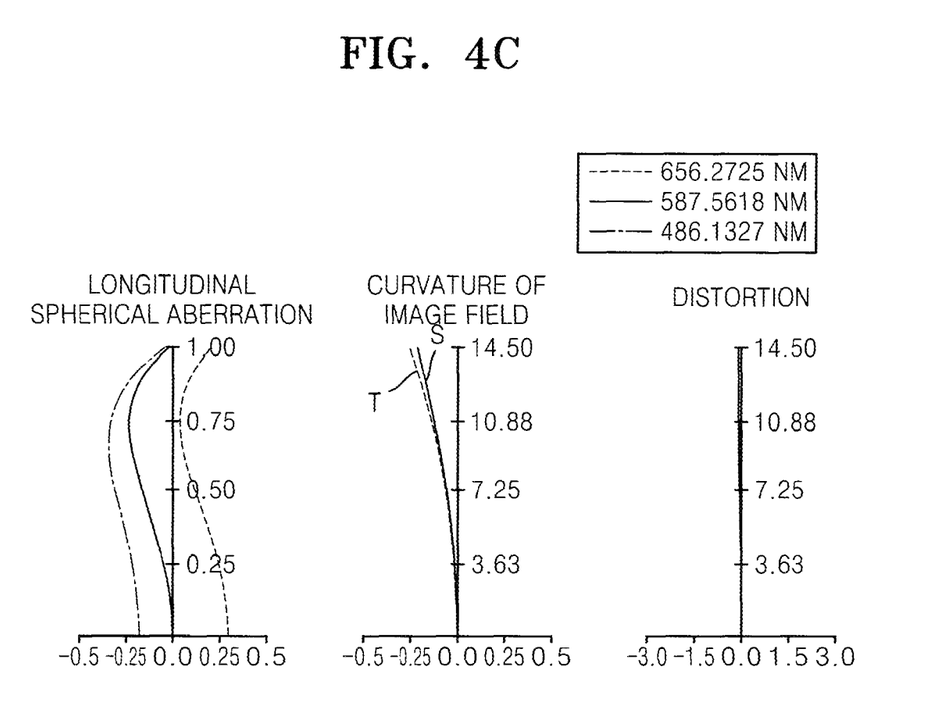
FIG. 4C is a graph showing longitudinal spherical aberration, curvature of an image field, and distortion of the lens system illustrated in FIG. 3, when M=−1.0.
Figure 5:
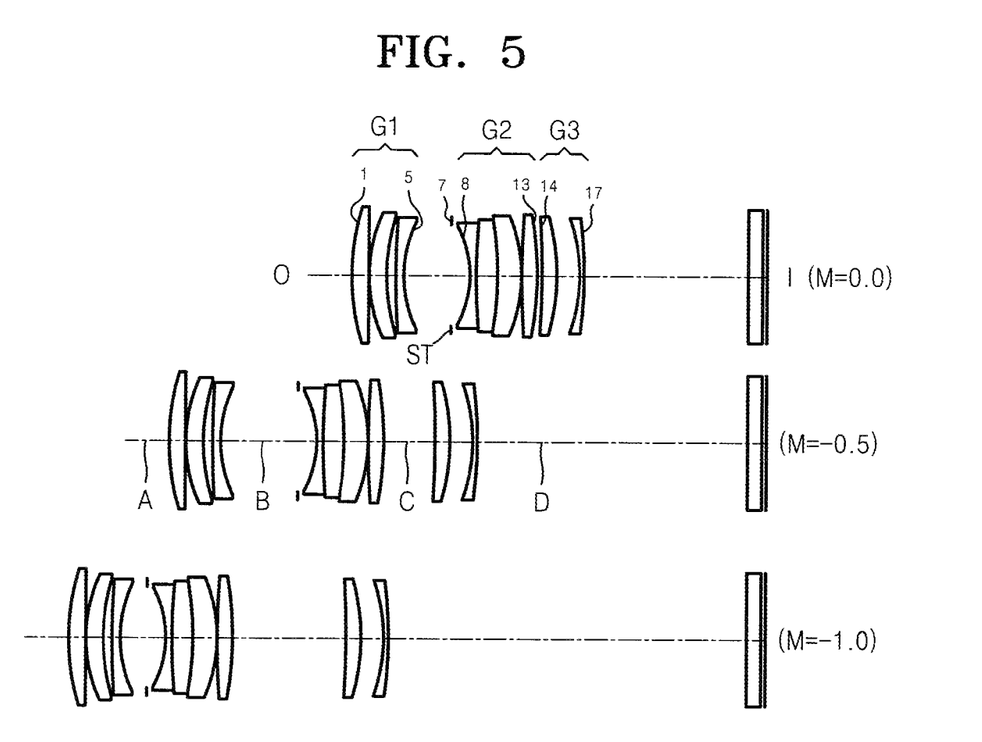
FIG. 5 is a view showing a structural arrangement of a lens system according to another embodiment of the present invention, when magnification (M) meets the following Equations: M=0, M=−0.5, and M=−1.0, respectively.
Figure 6A:
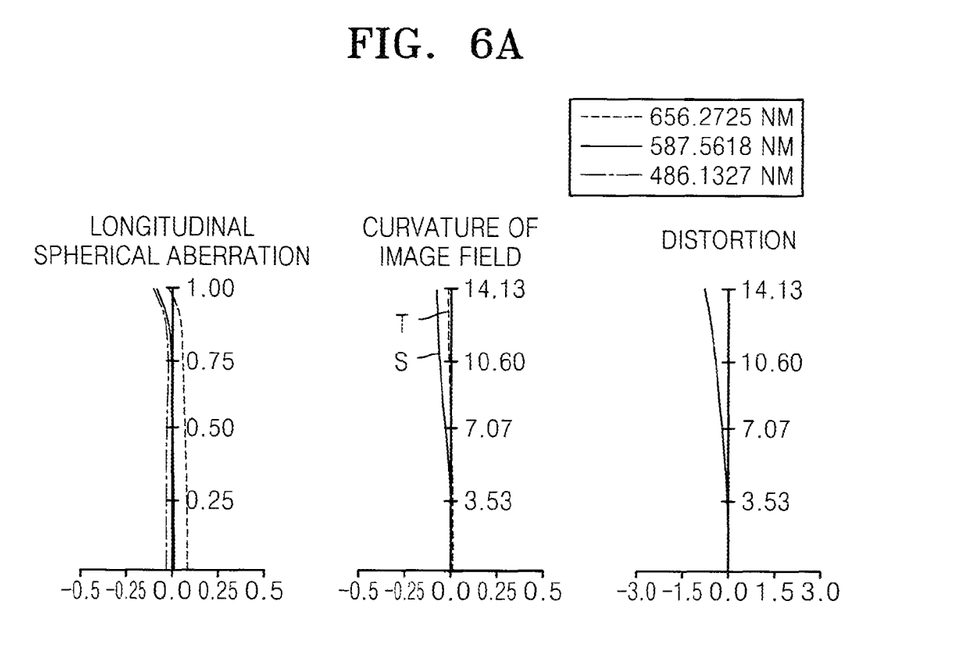
FIG. 6A is a graph showing longitudinal spherical aberration, curvature of an image field, and distortion of the lens system illustrated in FIG. 5, when M=0.0.
Figure 6B:
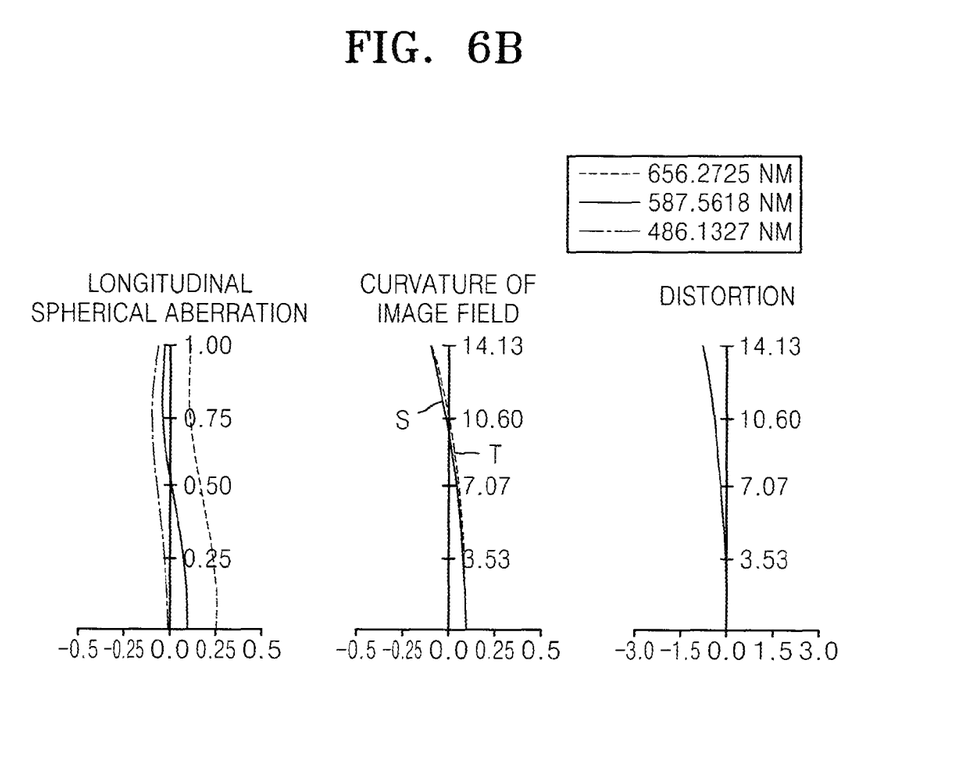
FIG. 6B is a graph showing longitudinal spherical aberration, curvature of an image field, and distortion of the lens system illustrated in FIG. 5, when M=−0.5.
Figure 6C:
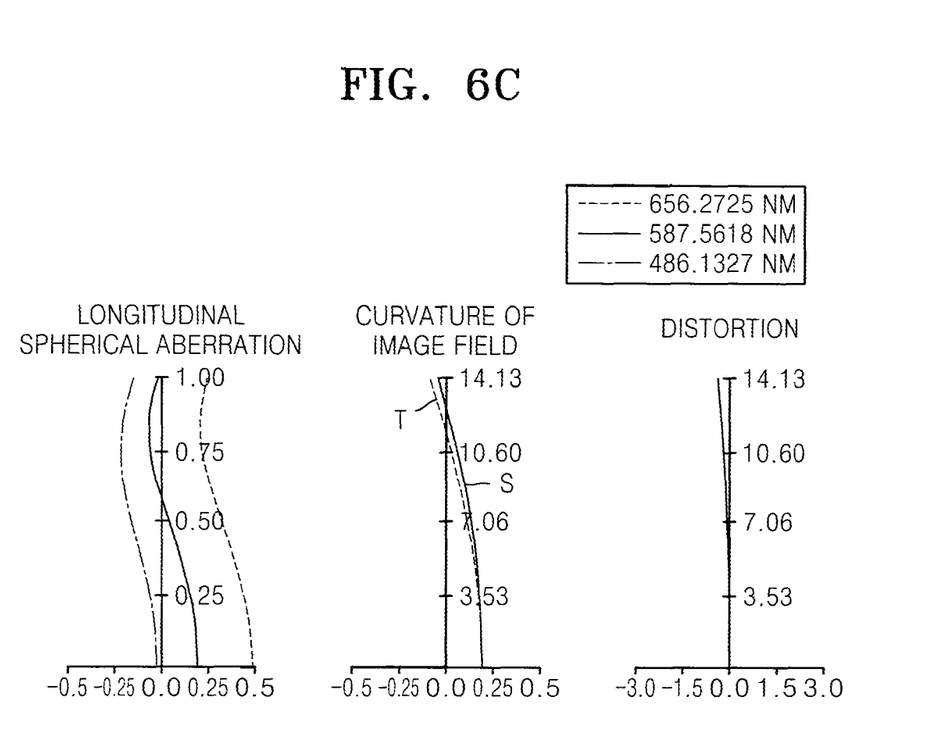
FIG. 6C is a graph showing longitudinal spherical aberration, curvature of an image field, and distortion of the lens system illustrated in FIG. 5, when M=−1.0.
Figure 7:
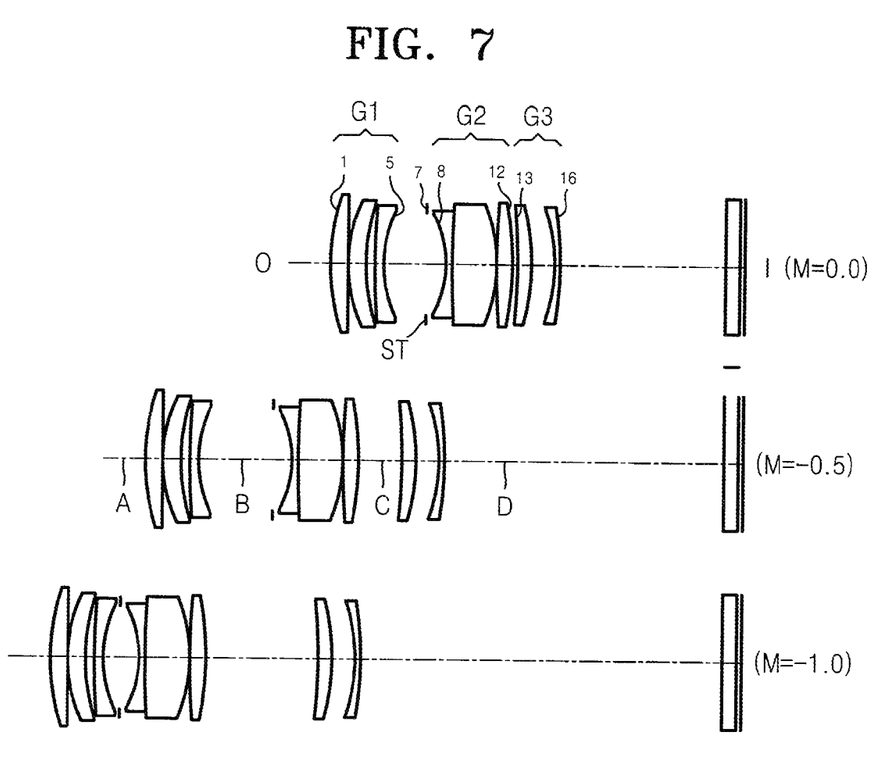
FIG. 7 is a view showing a structural arrangement of a lens system according to another embodiment of the present invention, when magnification (M) meets the following Equations: M=0, M=−0.5, and M=−1.0, respectively.
Figure 8A:
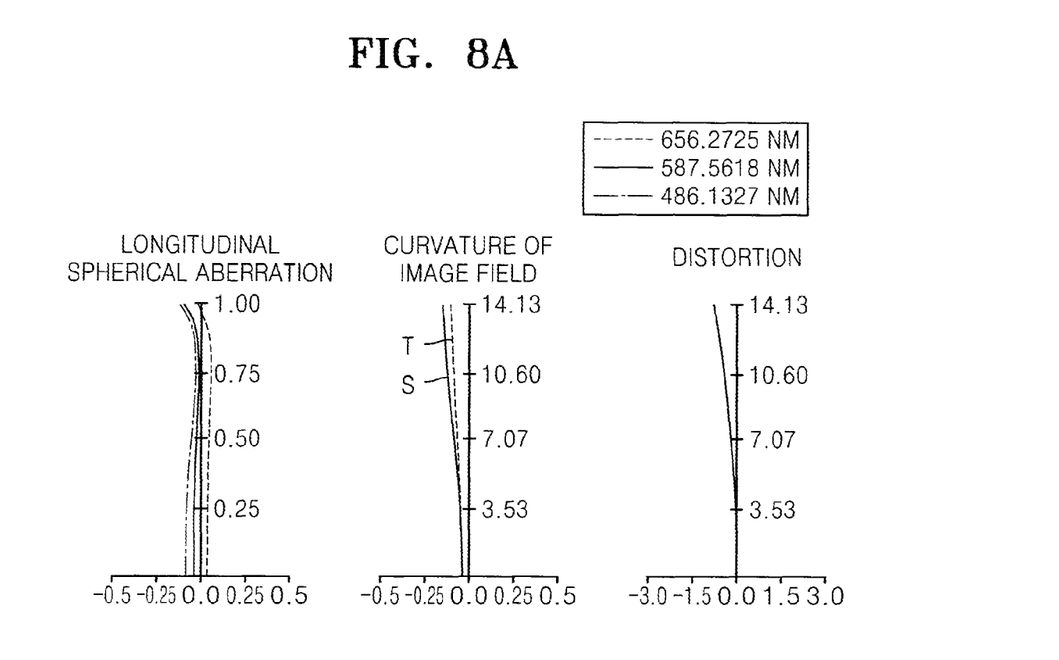
FIG. 8A is a graph showing longitudinal spherical aberration, curvature of an image field, and distortion of the lens system illustrated in FIG. 7, when M=0.0.
Figure 8B:
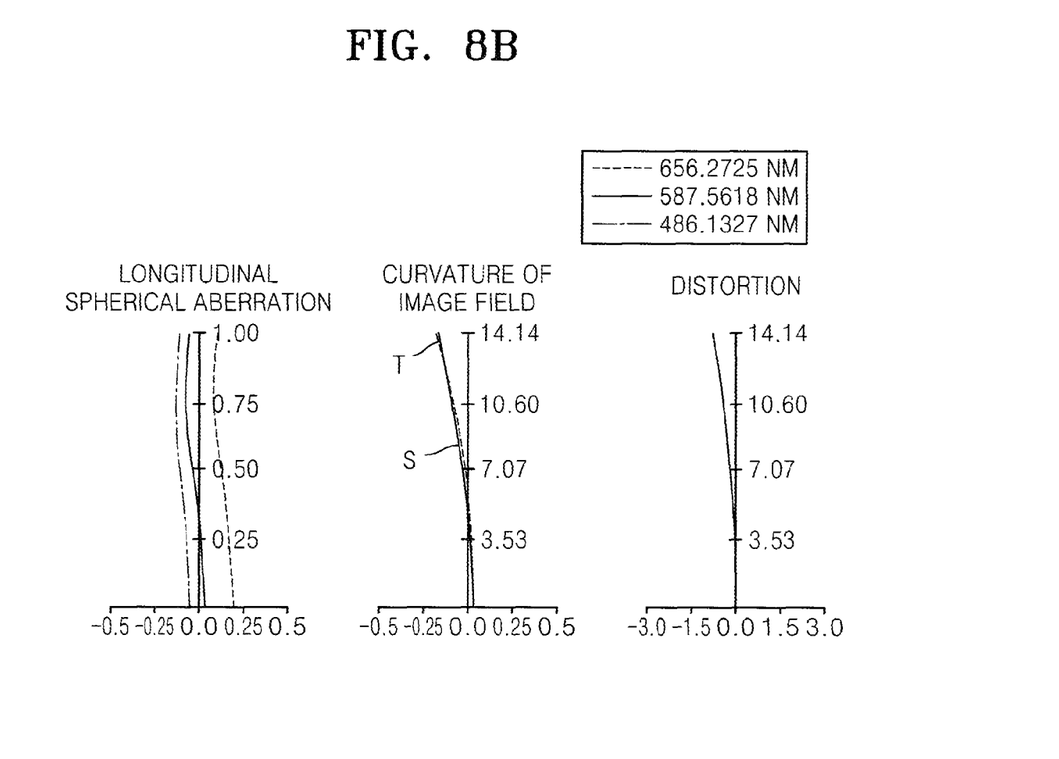
FIG. 8B is a graph showing longitudinal spherical aberration, curvature of an image field, and distortion of the lens system illustrated in FIG. 7, when M=−0.5.
Figure 8C:
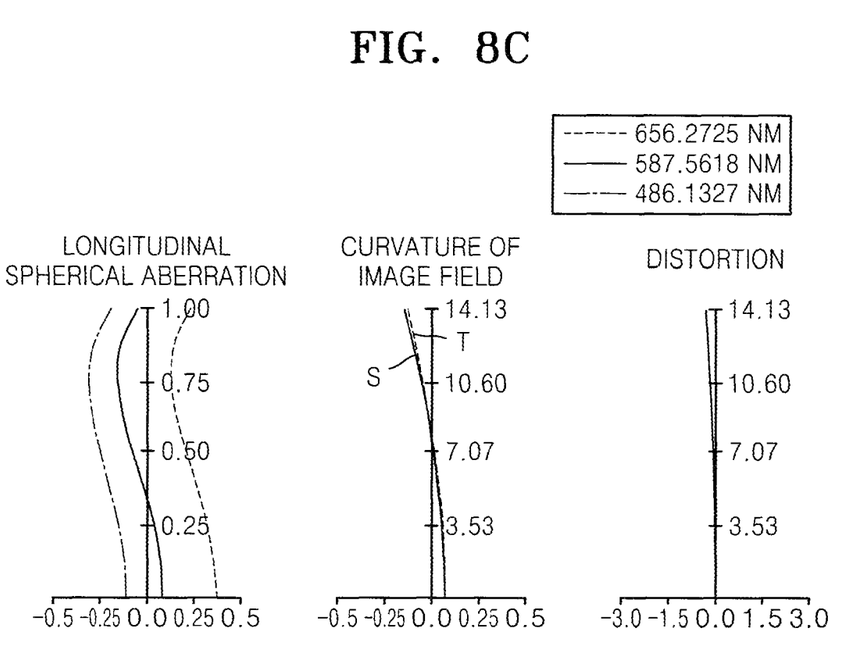
FIG. 8C is a graph showing longitudinal spherical aberration, curvature of an image field, and distortion of the lens system illustrated in FIG. 3, when M=−1.0.

In addition, the single-focus lens system of FIG. 1 further includes at least one cemented lens so as to minimize high-order aberration. For example, the second lens group G2 may include a doublet or triplet cemented lens so as to improve resolution. For example, FIGS. 1 and 7 illustrate a lens system including doublet cemented lenses, and FIGS. 3 and 5 illustrate a lens system including triplet cemented lenses.

Specific design data of the single-focus lens system of FIG. 1 will now be described. Hereinafter, f is the overall focal length of the lens system, and 2ω is a viewing angle, and R is the radius of curvature, and Dn is the thickness of the center is of a lens or a distance between lenses, and $n_d$ is a refractive index of a lens, and $v_d$ is the Abbe number. Also, ST represents an aperture stop, and A, B, C, and D are variable distances, and OBJECT is an object plane, and IMAGE is an image plane.

First Embodiment

FIG. 1 is a view showing a structural arrangement of a lens system according to an embodiment of the present invention, when magnification (M) meets the following Equations: M=0, M=−0.5, and M=−1.0, respectively.

| f = 58.6 mm, F-number = 2.05, 2ω = 27.8° | | | | |
|---|---|---|---|---|
| Lens surface | R | Dn | $n_d$ | $v_d$ |
| OBJECT | ∞ | A | | |
| S1 | 51.415 | 4.78 | 1.77250 | 49.6 |
| S2 | 622.841 | 0.1 | | |
| S3 | 26.687 | 5 | 1.73400 | 51.1 |
| S4 | 43.309 | 3.339 | | |
| S5 | 87.868 | 2 | 1.69895 | 30.1 |
| S6 | 19.416 | B | | |
| STOP | ∞ | 3.75 | | |
| S8 | −21.047 | 1.2 | 1.72825 | 28.3 |
| S9 | 39.981 | 7.92 | 1.80610 | 33.3 |
| S10 | −31.28 | 0.1 | | |
| S11 | ∞ | 3 | 1.83481 | 42.7 |
| S12 | −62.328 | C | | |
| S13 | ∞ | 3.5 | 1.80420 | 46.5 |
| S14 | −50.854 | 1.663 | | |
| S15 | −44.358 | 1.2 | 1.72825 | 28.3 |
| S16 | −126.89 | D | | |
| S17 | ∞ | 3.7 | 1.51680 | 64.2 |
| S18 | ∞ | | | |
| IMAGE | ∞ | | | |

The following numerical chart shows variable distances between lenses according to magnifications.

| Variable distance | M = 0.0 | M = −0.5 | M = −1.0 |
|---|---|---|---|
| A | ∞ | 150.7431 | 90.6794 |
| B | 8.3878 | 9.8162 | 10.0156 |
| C | 1.0500 | 17.2793 | 36.5909 |
| D | 33.2895 | 54.4316 | 77.6372 |

Figure 2A:
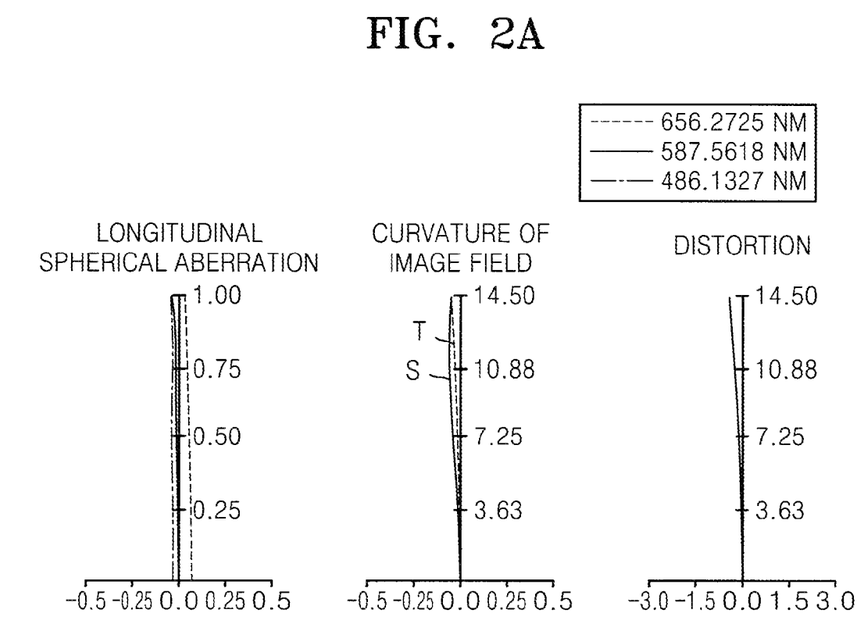
FIG. 2A is a graph showing longitudinal spherical aberration, curvature of an image field, and distortion of the lens system illustrated in FIG. 1, when M=0.0.

FIG. 2A is a graph showing longitudinal spherical aberration, curvature of an image field, and distortion of the lens system illustrated in FIG. 1, when M=0.0.

Figure 2B:
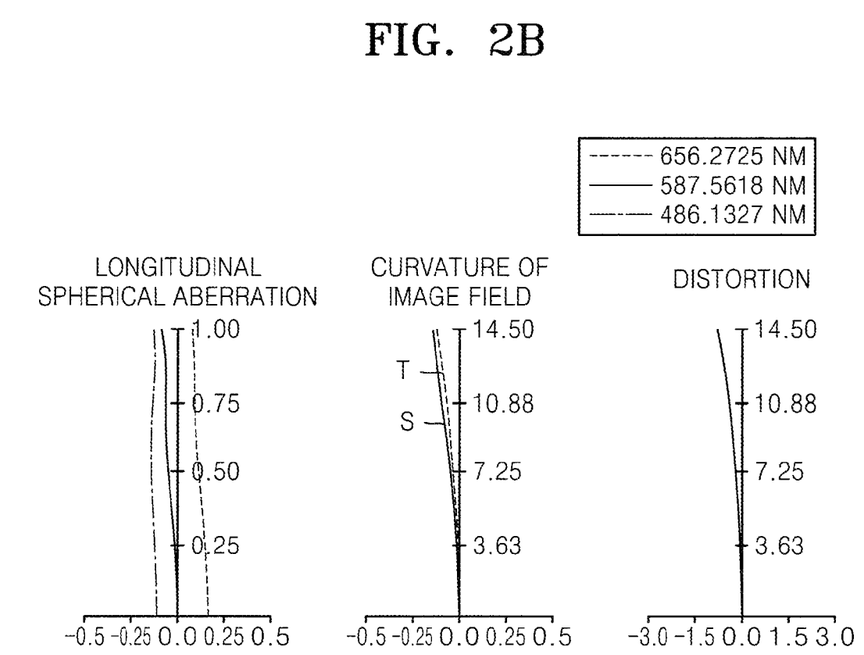
FIG. 2B is a graph showing longitudinal spherical aberration, curvature of an is image field, and distortion of the lens system illustrated in FIG. 1, when M=−0.5.

FIG. 2B is a graph showing longitudinal spherical aberration, curvature of an image field, and distortion of the lens system illustrated in FIG. 1, when M=−0.5.

Figure 2C:
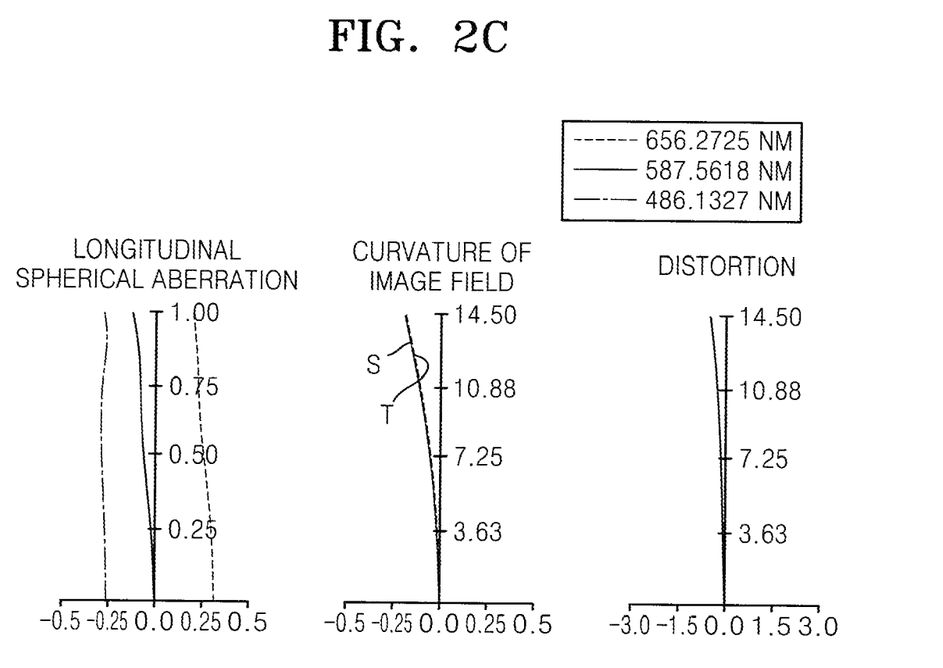
FIG. 2C is a graph showing longitudinal spherical aberration, curvature of an image field, and distortion of the lens system illustrated in FIG. 1, when M=−1.0.

FIG. 2C is a graph showing longitudinal spherical aberration, curvature of an image field, and distortion of the lens system illustrated in FIG. 1, when M=−1.0. Spherical aberration occurs in relation to C-line, d-line, and F-line. C-line has wavelength of 656.3 nm, and d-line has wavelength of 587.6 nm, and F-line has wavelength of 486.1 nm. In the curvature of the image field, a solid line is aberration with respect to a sagittal image plane, and a dotted line is aberration with respect to a tangential image plane.

Second Embodiment

FIG. 3 is a view showing a structural arrangement of a lens system according to another embodiment of the present invention, when magnification (M) meets the following Equations: M=0, M=−0.5, and M=−1.0, respectively.

| f = 59.2 mm, F-number = 2.08, 2ω = 27.5 | | | | |
|---|---|---|---|---|
| Lens surface | R | Dn | $n_d$ | $v_d$ |
| OBJECT | ∞ | A | | |
| S1 | 74.46 | 4.8 | 1.77250 | 49.6 |
| S2 | −342.785 | 0.1 | | |
| S3 | 27.711 | 3.36 | 1.88300 | 40.8 |
| S4 | 47.168 | 4.428 | | |
| S5 | 120.036 | 1.05 | 1.68893 | 31.2 |
| S6 | 22.912 | B | | |
| ST | ∞ | 3.75 | | |
| S8 | −23.071 | 1.5 | 1.80518 | 25.5 |
| S9 | 86.255 | 4.5 | 1.58144 | 40.9 |
| S10 | −63.297 | 5.26 | 1.88300 | 40.8 |
| S11 | −34.74 | 0.1 | | |
| S12 | 139.071 | 3.32 | 1.83481 | 42.7 |
| S13 | −53.652 | C | | |
| S14 | −100.523 | 4.23 | 1.92286 | 20.9 |
| S15 | −47.527 | 4.8 | | |
| S16 | −38.705 | 1.2 | 1.92286 | 20.9 |
| S17 | −77.326 | D | | |
| S18 | ∞ | 3.0 | 1.51680 | 64.2 |
| S19 | ∞ | | | |
| IMAGE | ∞ | | | |

| Variable distance | M = 0.0 | M = −0.5 | M = −1.0 |
|---|---|---|---|
| A | ∞ | 152.2210 | 94.2252 |
| B | 3.6709 | 9.5974 | 3.6700 |
| C | 1.0453 | 12.0208 | 39.0369 |
| D | 34.9979 | 53.1834 | 52.7320 |

Third Embodiment

FIG. 5 is a view showing a structural arrangement of a lens system according to another embodiment of the present invention, when magnification (M) meets the following Equations: M=0, M=−0.5, and M=−1.0, respectively.

| f = 59.0 mm, F-number = 2.06, 2ω = 27.1° | | | | |
|---|---|---|---|---|
| Lens surface | R | Dn | $n_d$ | $v_d$ |
| OBJECT | ∞ | A | | |
| S1 | 47.004 | 3.68 | 1.75700 | 47.7 |
| S2 | ∞ | 0.1 | | |
| S3 | 31.912 | 3.75 | 1.88300 | 40.8 |
| S4 | 42.82 | 1.9 | | |
| S5 | 172.793 | 1.76 | 1.67270 | 32.2 |
| S6 | 25.94 | B | | |
| ST | ∞ | 4 | | |
| S8 | −21.741 | 1.34 | 1.71736 | 29.5 |
| S9 | 130.087 | 4.59 | 1.67790 | 55.5 |
| S10 | −70 | 5.1 | 1.73400 | 51.1 |
| S11 | −32.634 | 0.1 | | |
| S12 | 189.443 | 3.27 | 1.83400 | 37.3 |
| S13 | −68.927 | C | | |
| S14 | −147.495 | 3 | 1.88300 | 40.8 |
| S15 | −47.218 | 4.9 | | |
| S16 | −35.745 | 1.2 | 1.72825 | 28.3 |
| S17 | −78.467 | D | | |
| S18 | ∞ | 3 | 1.51680 | 64.2 |
| S19 | ∞ | | | |
| IMAGE | ∞ | | | |

| Variable distance | M = 0.0 | M = -0.5 | M = -1.0 |
|---|---|---|---|
| A | ∞ | 147.3272 | 93.2963 |
| B | 10.1333 | 15.9676 | 5.4861 |
| C | 1.0600 | 11.0755 | 24.1514 |
| D | 35.0483 | 57.8583 | 76.6843 |

Fourth Embodiment

FIG. 7 is a view showing a structural arrangement of a lens system according to another embodiment of the present invention, when magnification (M) meets the following Equations: M=0, M=-0.5, and M=-1.0, respectively.

| f = 59.0 mm, F-number = 2.06, 2ω = 27.1° | | | | |
|---|---|---|---|---|
| Lens surface | R | Dn | $n_d$ | $v_d$ |
| OBJECT | ∞ | A | | |
| S1 | 46.282 | 3.68 | 1.75700 | 47.7 |
| S2 | ∞ | 0.1 | | |
| S3 | 31.4 | 3.75 | 1.88300 | 40.8 |
| S4 | 42.505 | 1.9 | | |
| S5 | 186.077 | 1.76 | 1.67270 | 32.2 |
| S6 | 25.377 | B | | |
| STOP | ∞ | 4 | | |
| S8 | -21.956 | 1.34 | 1.71736 | 29.5 |
| S9 | 215.898 | 9.45 | 1.69680 | 55.5 |
| S10 | -32.424 | 0.1 | | |
| S11 | 184.91 | 3.27 | 1.83400 | 37.3 |
| S12 | -68.965 | C | | |
| S13 | -140.665 | 3 | 1.88300 | 40.8 |
| S14 | -46.304 | 4.9 | | |
| S15 | -34.821 | 1.2 | 1.72825 | 28.3 |
| S16 | -75.573 | D | | |
| S17 | ∞ | 3 | 1.51680 | 64.2 |
| S18 | ∞ | | | |
| IMAGE | ∞ | | | |

| Variable distance | M = 0.0 | M = -0.5 | M = -1.0 |
|---|---|---|---|
| A | ∞ | 148.9395 | 95.6716 |
| B | 9.1317 | 15.6779 | 3.6939 |
| C | 1.0643 | 9.4755 | 23.8529 |
| D | 35.0017 | 58.8890 | 76.4792 |

Next, each of the embodiments of the present invention satisfies Equations 1 through 3, as shown in the chart below.

| | First embodiment | Second embodiment | Third embodiment | Fourth embodiment |
|---|---|---|---|---|
| Equation 1 | 0.46 | 0.53 | 0.53 | 0.53 |
| Equation 2 | 0.76 | 0.30 | 0.70 | 0.70 |
| Equation 3 | 1.728~1.804 | 1.923 | 1.883~1.728 | 1.883~1.728 |

As described above, the single-focus lens system according to the present invention has a large aperture and a small size and is light weight and is capable of close-up photographing up to 1 magnification. In addition, three lens groups that comprise the single-focus lens system are movable, relative to one another, during focusing so that the single-focus lens system can be miniaturized. The single-focus lens system according to the present invention has a double Gauss shape and can easily correct aberration.

While the present invention has been particularly shown and described with reference to exemplary embodiments thereof, it will be understood by those of is ordinary skill in the art that various changes in form and details may be made therein without departing from the spirit and scope of the present invention as defined by the following claims.

What is claimed is:
1. A lens system consisting of:
a first lens group having a positive refractive power;
a second lens group having a positive refractive power; and
a third lens group having a positive or negative refractive power,
wherein the first lens group comprises four or less lenses,
wherein the first through third lens groups are movable, independently along an optical axis, during focusing,
wherein the lens system has magnification in a range from −1 to 0, and
wherein the third lens group satisfies the following Equation

$$0.25 \leq \frac{\Delta d_3}{f} \leq 0.8$$

where $\Delta d_3$ is the amount of movement of the third lens group, and f is the focal length of the overall lens system.

2. The lens system of claim 1, further comprising an aperture stop disposed between the first lens group and the second lens group.

3. The lens system of claim 1, wherein the third lens group has a refractive index according to the following Equation $$1.65 \leq n_d \leq 2.0$$

where $n_d$ is the refractive index at d-line of the material used in the third lens group.

4. The lens system of claim 1, wherein the second lens group comprises doublet or triplet cemented lenses.

5. A lens system comprising:
a first lens group having a positive refractive power;
a second lens group having a positive refractive power; and
a third lens group having a positive or negative refractive power,
wherein the first through third lens groups are movable, independently along an optical axis, during focusing,
wherein the lens system is configured to provide magnifications covering an entire range from −1 to 0 and satisfies the following Equation $$0.4 \leq \frac{f_2}{f_1} \leq 0.6$$

where $f_1$ is the focal length of the first lens group, and $f_2$ is the focal length of the second lens group, and
wherein the third lens group satisfies the following Equation $$0.25 \leq \frac{\Delta d_3}{f} \leq 0.8$$

where $\Delta d_a$ is the amount of movement of the third lens group, and f is the focal length of the lens system.

6. The lens system of claim 5, further comprising an aperture stop disposed between the first lens group and the second lens group.

7. The lens system of claim 5, wherein the third lens group has a refractive index according to the following Equation 5

$$1.65 \leq n_d \leq 2.0$$

where $n_d$ is the refractive index at d-line of the material used in the third lens group.

8. The lens system of claim 5, wherein the second lens group comprises doublet or triplet cemented lenses.

9. A lens system comprising:
a first lens group having a positive refractive power;
a second lens group having a positive refractive power; and
a third lens group having a positive or negative refractive power,
wherein the first lens group comprises four or less lenses,
wherein the first through third lens groups are movable, independently along an optical axis, during focusing,
wherein the lens system has magnification in a range from −1 to 0
wherein the third lens group satisfies the following Equation $$0.25 \leq \frac{\Delta d_3}{f} \leq 0.8$$

where $\Delta d_a$ is the amount of movement of the third lens group, and f is the focal length of the overall lens system, and
wherein the first lens group and the second lens group satisfy the following Equation $$0.4 \leq \frac{f_2}{f_1} \leq 0.6$$

where $f_1$ is the focal length of the first lens group, and $f_2$ is the focal length of the second lens group.

* * * * *